Patented Feb. 10, 1931

1,791,591

UNITED STATES PATENT OFFICE

TREVOR M. CAVEN, OF NEW YORK, N. Y., ASSIGNOR TO FREDERICK R. HAZARD, OF NEW YORK, N. Y.

CEMENT

No Drawing.  Application filed February 9, 1927.  Serial No. 167,073.

My invention relates to monolithic linings or walls constructed of a single material, normally a refractory oxide, such as $SiO_2$, and comprises (a) the cement per se; (b) the substantially monolithic wall or lining constructed from silica or other oxide brick and it; and (c) the method of making the substantially monolithic lining or wall. By employing the new cement it is possible to form a substantially monolithic wall, I believe, for the first time, the cement portion of which is of substantially the same color, the same strength and same material as the bricks which the cement binds together.

Formerly cements for setting bricks or other forms of burned ware have contained other materials than that of which the ware is made, thereby usually producing either a different colored appearance from the bricks or making it necessary to employ pigments or other substances to color the cement similarly to the bricks. Cements formerly used for the bonding of refractory oxide bricks have a chemical reaction with the brick when the brick is brought up to the critical temperature. This is due to the fact that either lime or clay is used in the bonding medium. Linings or walls constructed of silica or other refractory oxide brick are used to a large extend in chemical manufacture and also in open hearth steel furnaces. When these are brought up near the critical melting temperature of the brick, as is often necessary in use, a chemical reaction takes place between the lime or aluminum or other oxide in the cement and the other oxide in the brick, causing the cement to flux off very rapidly and leave crevices between the bricks and, in turn, the brick is worn off at its corners, thereby increasing the size of the quantitative chemical reaction chamber and distorting the chemical reaction that is taking place therein and causing the bricks to readily wear out at this point.

I have developed a cement, the subject matter of this application, constructed of refractory oxides of different physical form but preferably of the same chemical composition similar to the type of brick to be employed. In a specific embodiment of the invention I will describe silica, though it is understood that either bricks or cement constructed of other refractory oxides such as $Al_2O_3$, $Zr_2O_3$, and $MgO$, may be employed, I will assume that a normal silica brick, containing about 95% $SiO_2$ and 5% of suitable clay or lime binding, is employed and the cement to be used is constructed chiefly of silica.

Silica is known to exist in nature in a number of different forms, such as quartz, quartzite, silica sand, Baukite, rock crystals, amorphous silica and diatomaceous silica. Silica is also found in a colloidal condition in nature and an artificial colloidal form may be produced in a well-known manner by grinding with a proper amount of water. Any type of silica may be ground to a colloidal condition, first to a fine state in any grinding mill and then with water to a colloidal condition in a ball pebble mill to form silicic acid. The natural diatomaceous silica, due to its natural opaline crystalline structure, is easiest to grind to a colloidal state. It is possible to do this also with the amorphous or any other type of silica, but it is harder due to their different crystalline structure.

A considerable amount of research work has been done on the molecular arrangement of the different types of silica and some people believe that they form a ring similar to the benzol ring and the different forms are different isomers. It is true, however, that different types of silica have different molecular arrangements and different structures.

A preferred embodiment comprises natural or artificial colloidal silica 5%, diatomaceous silica 10% and ground quartzite 85%. The colloidal silica may be either natural or artificially ground. The colloidal and diatomaceous silica form the binding medium per se of the cement while the ground quartzite functions like crushed rock to give a body to the cement to prevent high shrinkage. It is an essential feature of my invention that one form of silica be in a colloidal condition in order to produce silicic acid to furnish the binding features of the cement, for silica unless it is in a colloidal condition will not function as a cement, or to form silicic acid.

The temperature of fusion of the different forms of silica varies to a large degree and, by properly proportioning the different forms of silica, a cement can be produced which will mature into a binding medium at a predetermined point lower than the ware which it is to cement together is burned at and will not have a harmful influence on the ware.

The specific embodiment of cement shown matures into a binding medium at substantially 1450° C. To raise the maturing point, eliminate diatomaceous or lower the amount of colloidal; to lower, increase colloidal and diatomaceous and the maturing point can be lowered to approximately 1000° C.

My improved cement therefor comprises two or more silicas of different maturing points, one of which is in colloidal form so proportioned that the temperature at which maturing takes place can be varied to a desired predetermined temperature. It is therefore possible to take one natural form of silica and mix it with a colloidal and also with another form, such as the diatomaceous form, to produce the cement. It is also possible to produce the cement by taking a form of silica, such as quartzite, pulverizing it, employing 85% and reducing the remaining 15% thereof to a colloidal condition and mixing it with the pulverized quartzite. Thus, the different forms, having different maturing points, of the different silicas may be obtained by the proper selection of natural silicas or by grinding a certain proportion of a natural silica to a colloidal state. When the refractory oxide is brought to a state of fine division, as stated, the maturing point is greatly reduced, and, as stated, by compounding in a suitable manner, it is possible to make a bonding cement which will bond the ware at any desired predetermined temperature. Even when the ware is brought up to the critical temperature, there is no reaction between the cement and brick as there is no chemical difference to start a reaction and, as the binding medium is of the same material as the brick, it will have the same strength, color, wearing qualities, resistance to heat and corrosion, to form with the brick a substantially monolithic structure.

A further advantage of the invention is that the last step in the process of making a monolithic structure, is one entirely done by the user. The same amount of water is used as is normally used with an ordinary cement and a wall is laid in the ordinary fashion. When the user in actual use brings the temperature of the furnace up to the temperature desired in use, it will naturally result in exceeding the maturing temperature of the cement so as to mature and set the cement and cause it to form with the brick a substantially monolithic structure.

In forming a substantially monolithic silica wall by the use of preformed silica brick and the improved embodiment of my cement given, it is obvious that the user must raise the heat above 1450° C. as he normally would in use, assuming that this is to be the lining of an open hearth furnace, when the substantially monolithic silica wall will be formed. It is interesting to note that the wall is changed into a monolithic structure by the first particular use of the consumer.

On the application of heat the silicic or other acid formed with water on grinding the refractory oxide to a colloidal state dries out and loses its excess water, but retains its chemical composition to act as the binding medium of the cement.

In the claim I employ the words "physical form" or "form" in a broad sense and to include refractory oxides of different molecular crystalline or other forms or of different degree of fineness.

I employ the term "refractory brick" to include any preformed refractory shape whether it be in true rectangular form or otherwise.

I employ the term "refractory oxide" to include refractory oxides used alone or in chemical combination with other acid or base elements.

It is understood that my invention is not limited to the specific embodiments described and that various deviations may be made therefrom without departing from the spirit and scope of the appended claim.

What I claim is:

A cement in dry pulverulent form containing about 5% silica in colloidal form, about 10% of silica in diatomaceous form and about 85% of silica in relatively coarse form, all of said silicas being of substantially the same chemical composition.

In testimony whereof, I have signed my name to this specification this 2nd day of February, 1927.

TREVOR M. CAVEN.